(12) United States Patent
Hung (10) Patent No.: US 7,818,846 B2
(45) Date of Patent: Oct. 26, 2010

(54) STRUCTURE AND MANUFACTURING METHOD OF COMBINATION-TYPE MALE HINGE

(75) Inventor: Lin-Kai Hung, Sanchong (TW)

(73) Assignee: Yuan Deng Metals Industrial Co., Ltd., Taoyuan (TW)

( * ) Notice: Subject to any disclaimer, the term of this patent is extended or adjusted under 35 U.S.C. 154(b) by 482 days.

(21) Appl. No.: 11/939,813

(22) Filed: Nov. 14, 2007

(65) Prior Publication Data

US 2009/0077768 A1 Mar. 26, 2009

(30) Foreign Application Priority Data

Sep. 21, 2007 (TW) ................ 96135566 A (51) Int. Cl.
*E05D 11/08* (2006.01)
(52) U.S. Cl. ................ 16/342; 16/273; 16/337
(58) Field of Classification Search ............ 16/342, 16/273, 337, 338, 340; 361/679.08, 679.11, 361/679.12, 679.27; 403/103, 111, 120, 403/297, 300; 248/920–923
See application file for complete search history.

(56) References Cited

U.S. PATENT DOCUMENTS

| | | | | |
|---|---|---|---|---|
| 6,038,739 A * | 3/2000 | Katoh | | 16/342 |
| 6,163,928 A * | 12/2000 | Chung | | 16/342 |
| 6,256,838 B1 * | 7/2001 | Lu | | 16/342 |
| 6,301,748 B1 * | 10/2001 | Su-Man | | 16/342 |
| 6,421,878 B1 * | 7/2002 | Kaneko et al. | | 16/330 |
| 6,988,294 B2 * | 1/2006 | Birtley | | 16/342 |
| 7,581,290 B2 * | 9/2009 | Chang | | 16/340 |
| 2002/0121002 A1 * | 9/2002 | Wu | | 16/342 |
| 2006/0032022 A1 * | 2/2006 | Minami | | 16/342 |
| 2007/0094845 A1 * | 5/2007 | Chang et al. | | 16/342 |

FOREIGN PATENT DOCUMENTS

JP        10026126 A  *  1/1998

* cited by examiner

*Primary Examiner*—Chuck Y. Mah
(74) *Attorney, Agent, or Firm*—Pro-Techtor Int'l Services; Ralph Willgohs (57) ABSTRACT

A method is applied to manufacture a combination-type male hinge comprising a connection portion and a shaft portion extended from the connection portion, and comprises the steps of: forming a plurality of connection plates by punching along at least one punching direction; making each connection plate have a punched peripheral surface and at least one perforating hole; making the punched peripheral surface have at least one sheared region and at least one torn region; and perforating the perforating holes of the connection plates by a extension bar extended from the connection portion, so as to connect the connection plates and manufacture the shaft portion of the combination-type male hinge.

10 Claims, 7 Drawing Sheets

STRUCTURE AND MANUFACTURING METHOD OF COMBINATION-TYPE MALE HINGE

FIELD OF THE INVENTION

The present invention relates to a structure and manufacturing method of a male hinge, and more particularly to a structure and manufacturing method of a combination-type male hinge, in which a extension bar perforates a plurality of connection plates to from the shaft portion of the male hinge.

BACKGROUND OF THE INVENTION

In daily life, a hinge structure is usually assembled between two objects to make a foldable object, comprises the two objects, be capable of lifting-opened and closing. An existed hinge structure usually comprises a male hinge and a female hinge. The male hinge comprises a connection portion and a shaft, and the female hinge usually comprises another connection portion and a socket portion. In general, the shaft of the male hinge is rotatably assembled into the socket portion of the female hinge, the connection portion of the male is connected to a first object, and the connection portion of the female hinge is connected to a second object. Therefore, the first object can rotate by a center of the shaft to make the first object be capable of lifting-opened from the second object, or be capable of closing to the second object, so as to form the foldable object as mentioned.

Due to that the shaft of the male hinge are worn with the socket portion of the female hinge, it is usually necessary to formed with a plurality of grooves, i.e., lubrication grooves, for receiving lubricant, so as to lubricate the shaft and the socket portion when the shaft rotatably assembles into the socket portion.

Figure 1:
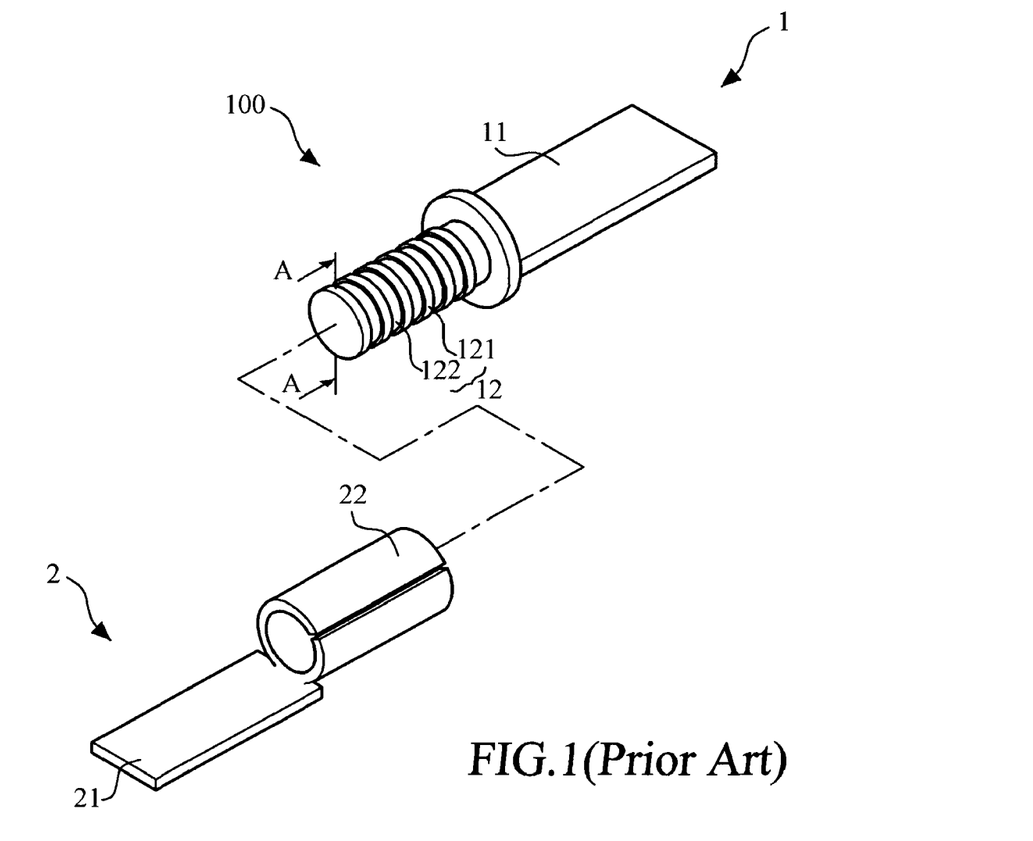
FIG. 1 illustrates an exploded view of a hinge structure made in prior arts.
Figure 2:
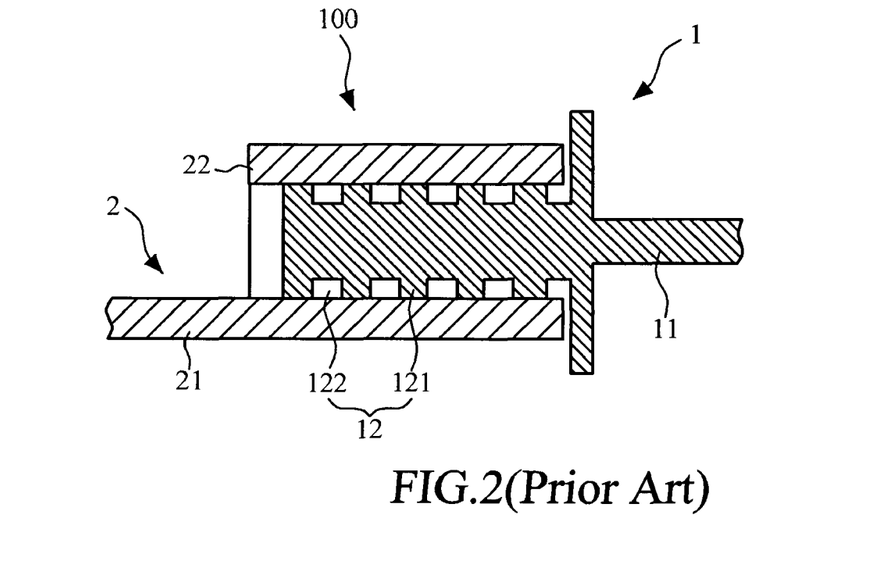
FIG. 2 illustrates a partial sectional view along A-A direction after the shaft portion is rotatably assembled into the socket portion in FIG. 1.

In the prior arts as mentioned, a conventional hinge structure is applied for detail description. Please refer to FIG. 1 and FIG. 2, wherein FIG. 1 illustrates an exploded view of a hinge structure in prior arts, FIG. 2 is a partial sectional view along A-A direction in FIG. 1 after the shaft portion is rotatably assembled into the socket portion. As shown in the figures, a hinge structure 100 comprises a male hinge 1 and a female hinge 2. The male hinge 1 comprises a connection portion 11 and a shaft portion 12 extended from the shaft portion 11, and the shaft portion 12 comprises a plurality of diametrical protrusions 121 and diametrical grooves 122. The diametrical grooves 122 are diametrically recessed form the diametrical protrusions 121. The female hinge 2 comprises a connection portion 21 and a socket portion 22 extended from the socket portion 21.

As shown in FIG. 2, when the shaft portion 11 of the male hinge 1 is rotatably assembled into the socket portion 22 of the female hinge 2, a plurality of ring-alike spaces are formed between the diametrical grooves 122 and the socket portion 22. Thus, it is able to fill lubricants into the ring-alike spaces to lubricate the shaft portion 12 and the socket portion 22, so as the reduce the wear between the shaft portion 12 and the socket portion 22 when the male hinge 1 rotates with respect to the female hinge 2.

People skilled in ordinary arts can realize that in the prior arts as disclosed, the diametrical grooves 122 are usually formed by cutting. Moreover, ignoring the material properties of the shaft portion 12, the socket portion 22 and the lubricants, the torque that can be provided between the male hinge 1 and the female hinge 2 is decided by two factors, wherein one factor is the fit condition between the shaft portion 12 and the socket portion 22, such as slight clearance fit, close fit, loose fit, etc., and the other factor is the contact area between the shaft portion 12 and the socket portion 22.

Going with the accumulation of the rotation times of that the male hinge 1 rotates with respect to the female hinge 2, the wear between the shaft portion 12 and the socket portion 22 is more and more serious. Therefore, neglecting the expansion and shrink effect caused by temperature variation, the outer diameter of the diametrical protrusions 121 reduces with the accumulation of the rotation times of that the male hinge 1 rotates with respect to the female hinge 2, so that the fit condition between the shaft portion 12 and the socket portion 22 is gradually trending to the loose fit; however, the contact area between the shaft portion 12 and the socket portion 22, i.e., the whole contact area between all the diametrical protrusions 121 and the socket portion 22 does not increase any.

People skilled in ordinary arts can further realize that in the prior arts as disclosed, under this background, the torque, which can be provided by the male hinge 1 and the female hinge 2 will be obviously reduced with the accumulation of the rotation times of that the male hinge 1 rotates with respect to the female hinge 2. In other words, the decay rate of the torque will be apparently increased to make the male hinge 1 and the female hinge 2 become unusable any more when the torque provided by the male hinge 1 and the female hinge 2 reduces to a specified torque value.

SUMMARY OF THE INVENTION

Making a summary, in the prior arts, there are two main problems should be overcome. Firstly, the decay rate decay rate of the torque are apparently increased to make due to that between the shaft portion and the socket portion, the fit condition gradually trends to the loose fit, while the contact area between the shaft portion and the socket portion does not increase any. Secondly, it is really very extravagant that the male hinge and the female hinge become unusable when the torque provided by the male hinge and the female hinge reduces to a specified torque value.

Thus, the primary object of the present invention provides a combination-type male hinge, in which a plurality of connection plate are formed by punching, so as to naturally formed at least one sheared region and at least one torn region. A shaft portion of the combination-type male hinge is made by perforating the connection plates by an extension bar, so that it is capable of reducing the decay rate of the torque provided by the combination-type male hinge and female hinge after the shaft portion is assembled into a socket portion of a male hinge.

The secondary objective of the present invention provides a combination-type male hinge, in which a plurality of connection plate are formed by punching, and a shaft portion of the combination-type male hinge is made by perforating the connection plates by an extension bar. After the shaft portion of the combination-type male hinge is assembled into a socket of a female hinge to from a hinge structure, it is able to replace new connection plates when the shaft portion and the socket portion are over-worn to lose their function.

Means of the present invention for solving the problems as mentioned above provides a method for manufacturing a combination-type male hinge. The method comprises the steps of: forming a plurality of connection plates by punching along at least one punching direction; making each connection plate have a punched peripheral surface and at least one perforating hole; making the punched peripheral surface have at least one sheared region and at least one torn region; and perforating the perforating holes of the connection plates by a extension bar extended from the connection portion, so as to connect the connection plates and manufacture the shaft portion of the combination-type male hinge.

For each of the connection plates, the sheared region is parallel to a central axis of the connection plate, and the central axis keeps in a first distance apart from the punched peripheral surface in the sheared region. Moreover, the central axis keeps in the first distance apart from the punched peripheral surface in the torn region near the shear region; and further keeps in a second distance, less than the first distance, apart from the punched peripheral surface in the torn region away from the sheared region. After the shaft portion is rotatably connected into the socket portion, a plurality of lubrication grooves are formed, and the sheared regions of all connection plates contact to the socket portion. Although the wear between the sheared and the socket portion makes the fit condition of the shaft portion and the socket portion be more and more trending to the loose fit, the contact area between the shaft portion and the socket portion increases more and more.

From above description, comparing with the technology as disclosed in prior arts, in the present invention, due to that the contact area between the shaft portion and the socket portion increases more and more when the wear between the sheared and the socket portion makes the fit condition of the shaft portion and the socket portion be more and more trending to the loose fit, so as to effectively reduce the decay of the torque between the combination-type male hinge and the female hinge.

Furthermore, due to that the shaft portion is made by perforating the connection plates by the extension bar, it is able to use the extension bar to perforate new connection plates to manufacture a renewed shaft portion fit for the socket portion when the shaft portion is over-worn or out of the requirement of the torque output.

The devices, characteristics, and the preferred embodiment of this invention are described with relative figures as follows.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The combination-type male hinge as provided in accordance with the present invention can widely use to manufacture many kinds of hinge structures, the combined applications are too numerous to be enumerated and described, so that only four preferred embodiments are disclosed as follows for representation.

Figure 3:
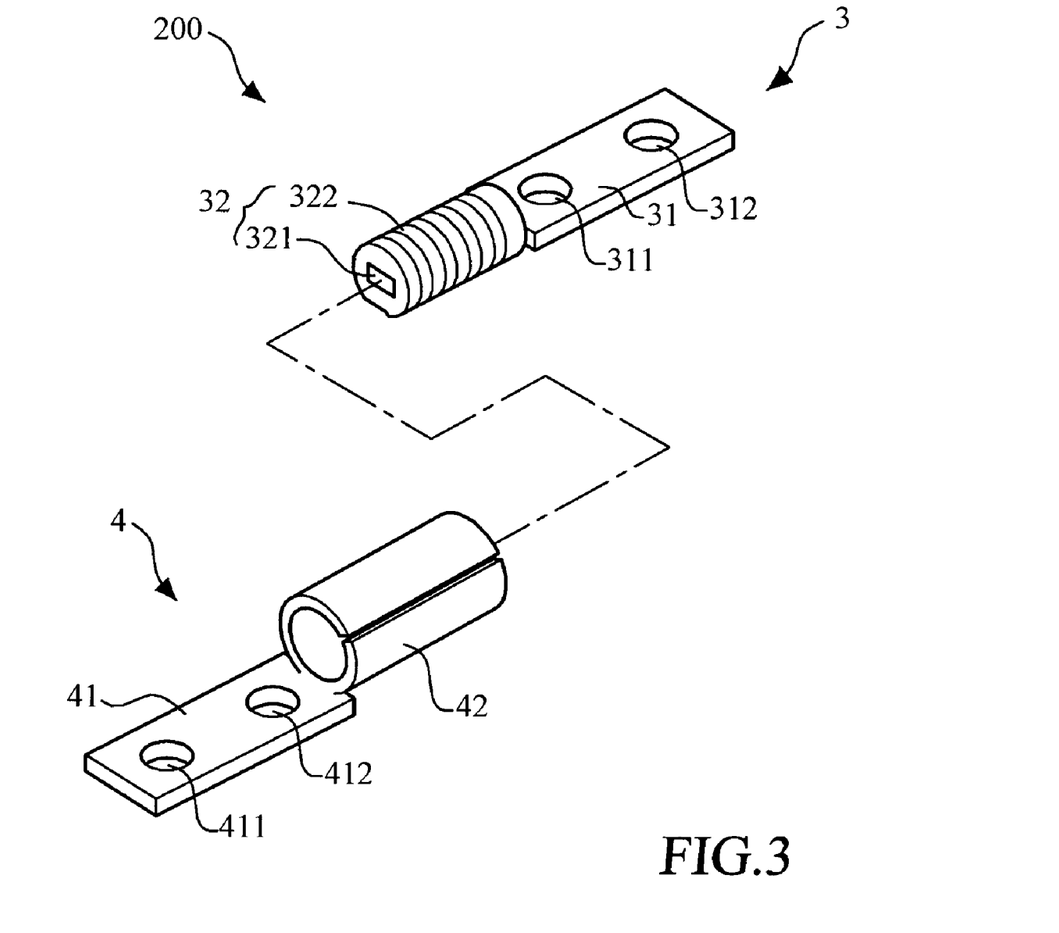
FIG. 3 illustrates an exploded view of a first embodiment of the present invention.
Figure 4:
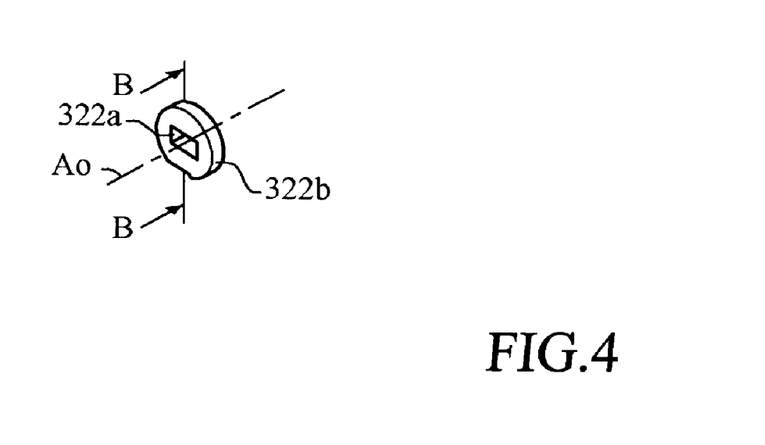
FIG. 4 illustrates a perspective view of a connection plate in accordance with the first embodiment of the present invention.
Figure 5:
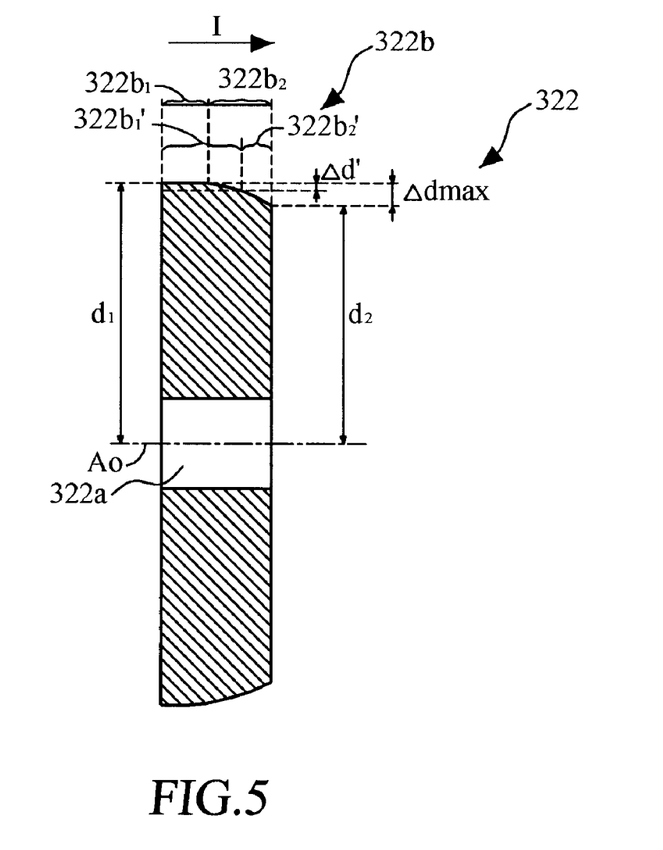
FIG. 5 illustrates a sectional view along B-B direction in FIG. 4.
Figure 6:
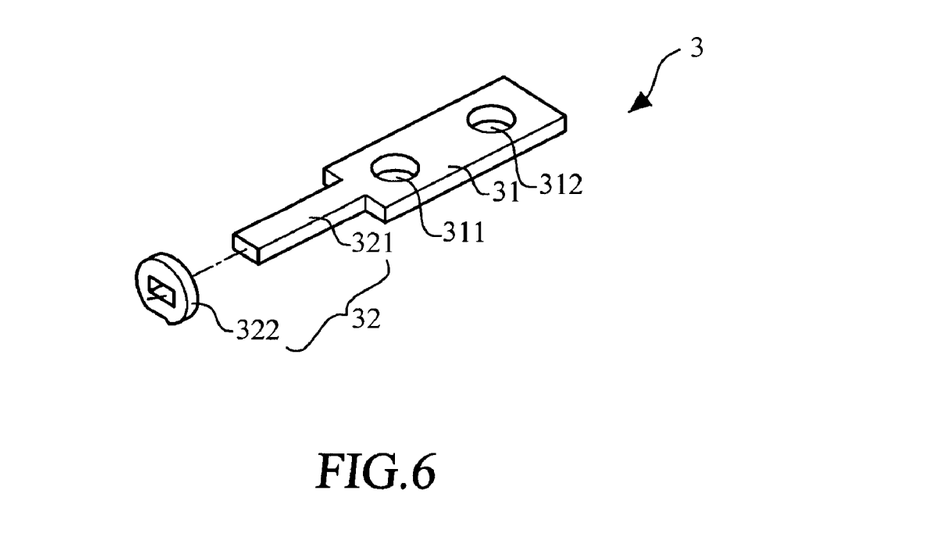
FIG. 6 illustrates the shaft portion is manufactured in a way of perforating the perforating holes of the connection plates by the extension bar in the first embodiment of the present invention.
Figure 7:
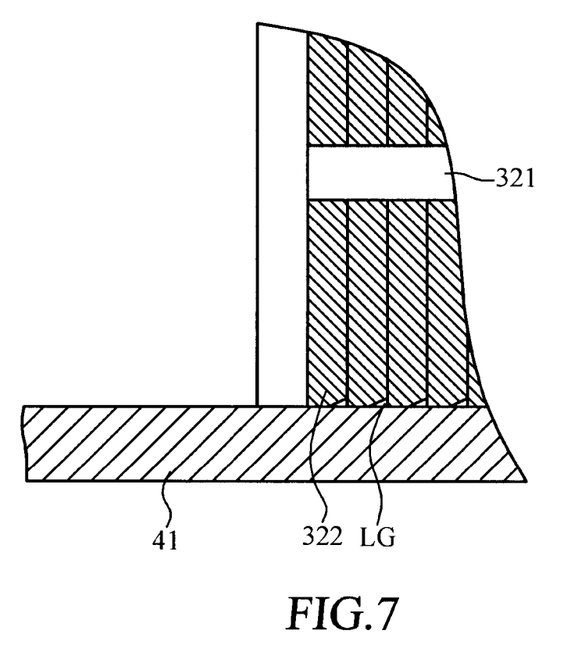
FIG. 7 illustrates that a plurality of lubrication grooves are formed after the shaft portion is assembled into the socket portion of the female hinge in accordance with the first embodiment of the present invention.

Please refer to FIG. 3 to FIG. 7, wherein FIG. 3 illustrates an exploded view of a first embodiment of the present invention; FIG. illustrates a perspective view of a connection plate in accordance with the first embodiment of the present invention; FIG. 5 illustrates a sectional view along B-B direction in FIG. 4; FIG. 6 illustrates the shaft portion is manufactured in a way of perforating the perforating holes of the connection plates by the extension bar in the first embodiment of the present invention; and FIG. 7 illustrates that a plurality of lubrication grooves are formed after the shaft portion is assembled into the socket portion of the female hinge in accordance with the first embodiment of the present invention.

As shown in the figures, a combination-type male hinge 13 comprises a connection portion 31 and a shaft portion 32. The connection portion 31 is formed with two connection holes 311 and 312 for a first object (not shown) connecting with the connection portion 31. The shaft portion 32 comprises an extension bar 321 extended from the connection portion 31 and a plurality of connection plates 322 being perforated by the extension bar 321, and the extension bar is formed in a rectangular cross section. A female hinge 4 comprises a connection portion 41 and a socket portion 42. The connection portion 41 is formed with two connection holes 411 and 412 for a second object (not shown) connecting with the connection portion 41.

After the shaft portion 32 is rotatably assembled into the socket portion 42, the male hinge 3 and the female hinge 4 are assembled to from a hinge structure 200. When the hinge structure 200 respectively connects to two objects via the connection holes 311, 312, 411 and 412, the hinge structure 200 and the two objects are assembled to form a foldable object (not shown). It is obvious that the connection between the hinge structure 200 and the two objects also can be carried out via soldering, riveting, clamping, clipping, adhering, jamming, etc.; therefore, in practice, it is not absolutely necessary to have the connection holes 311, 312, 411 and 412.

As shown in FIG. 4 and FIG. 5, each of the connection plates 322 is a substantial circular plate structure, i.e., a circular plate structure or a structure similar to a circular plate, and formed by punching a plate (not shown) along a first punching direction I. The connection plate 322 has an assembling hole 322a located in the center region, and the connection plate is further formed with a punched peripheral surface 322b, wherein the assembling hole is a rectangular hole matching to the rectangular cross section of the extension bar 321. The punched peripheral surface 322b is extended along the punching direction I, and comprises a sheared region 322b1, and a torn region 322b2 extended along the punching direction from the sheared region 322b1.

The perforating hole 322a has a central axis AO, which keeps in a first distance d1 apart from the punched peripheral surface 322b in the sheared region 322b1. The central axis AO keeps in the first distance d1 apart from the punched peripheral surface 322b in the torn region 322b2 near the shear region 322b1, and further keeps in a second distance d2, less than the first distance d1, apart from the punched peripheral surface 322b in the torn region 322b2 away from the sheared region 322b1. The deviation between the first distance d1 and the second distance d2 is a maximum deviated distance Δdmax.

As shown in FIG. 5, in the torn region 322b2 the distance between the central axis A0 and the punched peripheral surface 322b decreases along the punching direction I from the first distance d1 to the second distance d2. People skilled in ordinary arts can easily make out that above relations in dimensions are generated naturally when the thickness of the plate, which applied to be punched to form the connection plate, meets to some specified punching condition, such as a punching speed, dimension of the punching machine, punching time interval, punching frequency, etc.

From FIG. 5 and FIG. 7, after the extension bar 321 perforates the connection plates 322 to manufacture the shaft portion 32, which assembles into the socket portion 42, the sheared portion 322b1 of at least one of the connection plates 322 neighbors to the torn region 322b2 of another one of the connection plates 322. Meanwhile, a plurality of lubrication grooves LG will be formed between the shaft portion 32 and the socket portion 42.

After operating the hinge structure 200 for many times, the connection plates 322 and the socket portion 42 are worn with each other in a worn out depth Δd' to make the original punched peripheral surface become a contact region 322b1' contacting to the socket portion 42, and a non-contact region 322b2' not contacting to the socket portion 42. Form FIG. 5, it is obvious that the overall area of the contact region 322b1' is greater than that of the sheared region 322b1, which contacts to the socket portion 42 in original.

Therefore, people skilled in ordinary arts can easily make out that, neglecting the wear of the socket portion 42, i.e., assuming that the inner diameter of the socket portion 42 keeps in original, the deviation of the diametrical dimension between the shaft portion 32 and the socket portion 42 will increase to two times of the worn out depth, i.e. 2Δd', if the punched peripheral surface 322b is worn out in the worn out depth Δd'. Thus, it will increase the decay rate of the torque that the hinge structure 200 can provide.

However, after the shaft portion 32 is worn with the socket portion 42, the whole area of the connect region 322b1' will be greater than that of the sheared region 322b1, which contacts with the socket portion 42 in original. In other words, the overall contact area between the shaft portion 32 and the socket portion 42 after wearing will be greater than that in original. Thus, it will be helpful to reduce the decay of the torque that the hinge structure 200 can provide. From above description, it is obvious that the present invention can effectively reduce the decay of the torque between the combination-type male hinge 3 and the female hinge 4.

Additionally, in the embodiment of the present invention, the shaft portion 32 is manufactured in the way of perforating the connection plates 322 by the extension bar 321; therefore, when the torque between the combination-type male hinge 3 and the female decays to be out of the requirement of use, it is able to manufacture a renewed shaft portion in the way of perforating connect plates 322, preferably with a somewhat greater diametrical dimension, by the extension bar 321, so as to make the torque meet the requirement of use.

Figure 8:
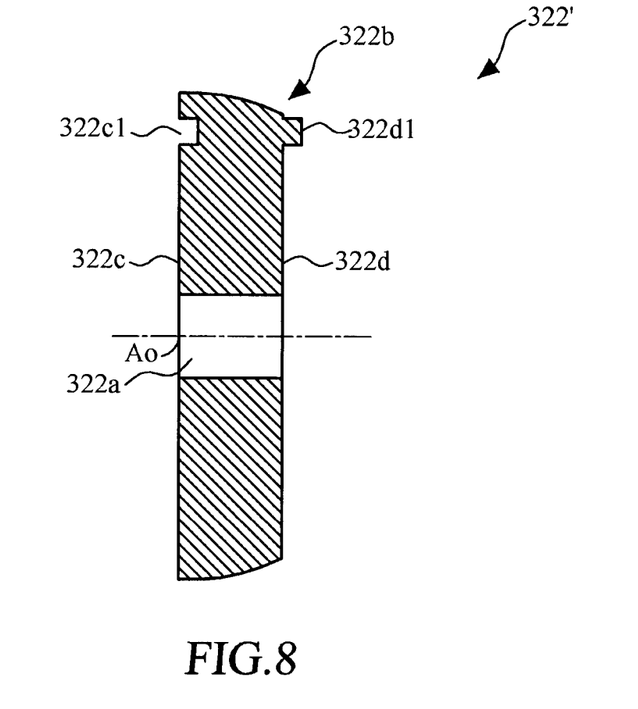
FIG. 8 illustrates that each connection plate is formed with a positioning groove on the first surface, and further formed with a positioning protrusion on the second surface in accordance with the first embodiment of the present invention.

Please refer to FIG. 8, which illustrates that each connection plate is formed with a positioning groove on the first surface, and further formed with a positioning protrusion on the second surface in accordance with the first embodiment of the present invention. As shown in the figures, in a preferred application of the first embodiment of the present invention, a plurality of connection plates 322' are applied to replace at least one of the connection plates 322. Differing from the connection plates 322, each of the connection plate 322' is formed with a positioning groove 322c1 on the first surface 322c, and further formed with a positioning protrusion 322d1 on the second surface 322d. When the extension bar 321 perforates the connection plates 322', the positioning protrusion 322d1 of at least one of the connection plate 322' is inserted into the positioning groove 322c1 of another one of the connection plates 322'.

After reading above description, it is undoubtedly that people skilled in ordinary arts can certainly make out the disclosed contents of the present invention. Following up, a simplified flowchart is provided for people skilled in ordinary to conveniently memorize the disclosed contents. Please refer to FIG. 9, which illustrates a simplified flowchart in accordance with the preferred application in accordance with the first embodiment of the present invention. Meanwhile, please refer FIG. 3 to FIG. 7 simultaneously.

Figure 9:
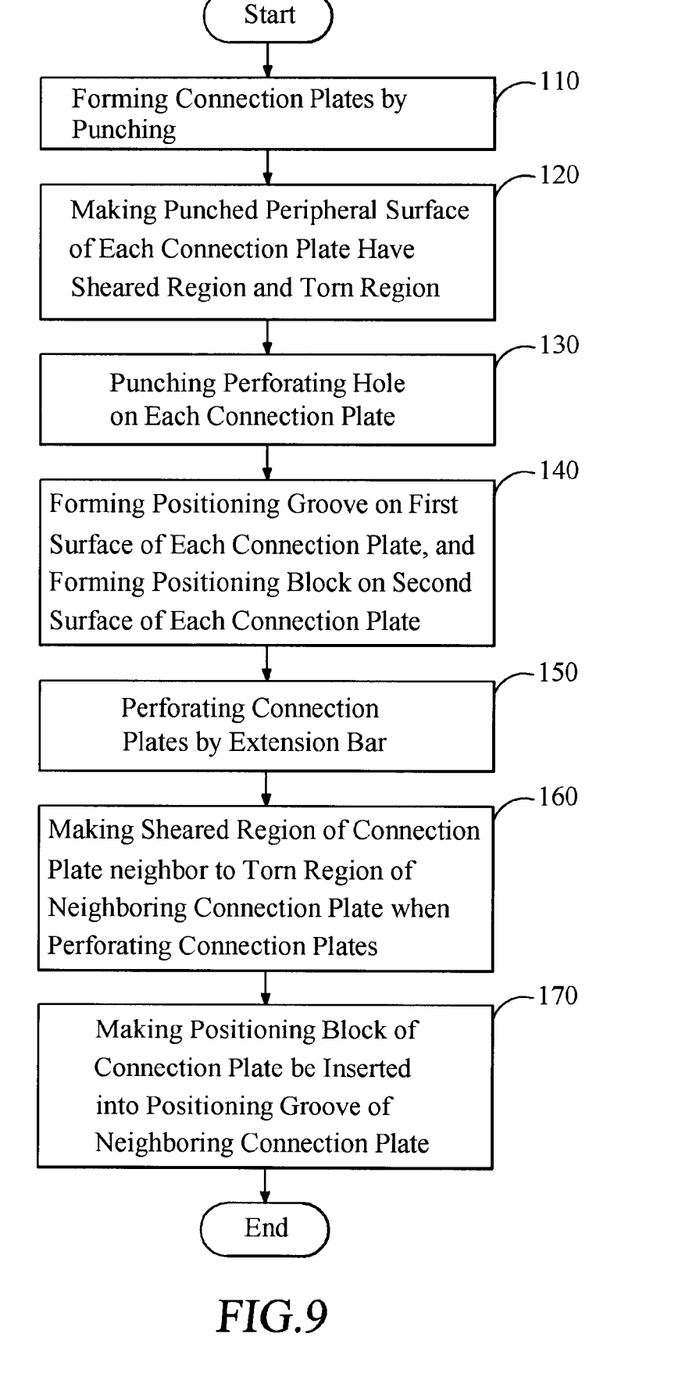
FIG. 9 illustrates a simplified flowchart in accordance with the preferred application in accordance with the first embodiment of the present invention.

As shown in the figures, when manufacturing the combination-type male hinge 3, it is necessary to form the connection plates 322 by punching a plate (step 110). When punching the plate, it is to select the plate with proper thickness and control the punching condition, so as to make each of the connect plates 322 obviously have a sheared region 322b1 and a torn region 322b2 (step 120), and simultaneously punching the perforating hole 322a on each of the connection plates 322 (step 130). In the preferred application of the first embodiment of the present invention, each of the connection plates 322 is formed with a positioning groove 322c1 on the first surface 322c, and further formed with a positioning protrusion 322d1 on the second surface 322d, so as that the connection plates 322 can form a plurality of connection plates 322' (step 140).

Then, perforate the connection plates 322' by the extension bar 321 (step 150); in this moment, the sheared region 322b1 of at least one of the connection plates 322' neighbors to the torn region 322b2 of another one of the connection plates 322'. In the preferred application of the first embodiment of the present invention, when perforating the connection plates 322' by the extension bar 321 (step 160), the positioning protrusion 322d1 of at least one of the connection plates is inserted into the positioning groove 322c1 of another one of the connection plates 322' (step 170).

People skilled in ordinary arts can easily realize that in the steps 110 to 140, the connection plates 322 or 322' can be formed by once, twice, or more times of punching. In the step 110, when punching to form the connection plates 322 or 322', it is able to make the connection plates directly connect together. Moreover, the steps 150 to 170 can be carried out in a single procedure by automated production or by manpower.

Figure 10:
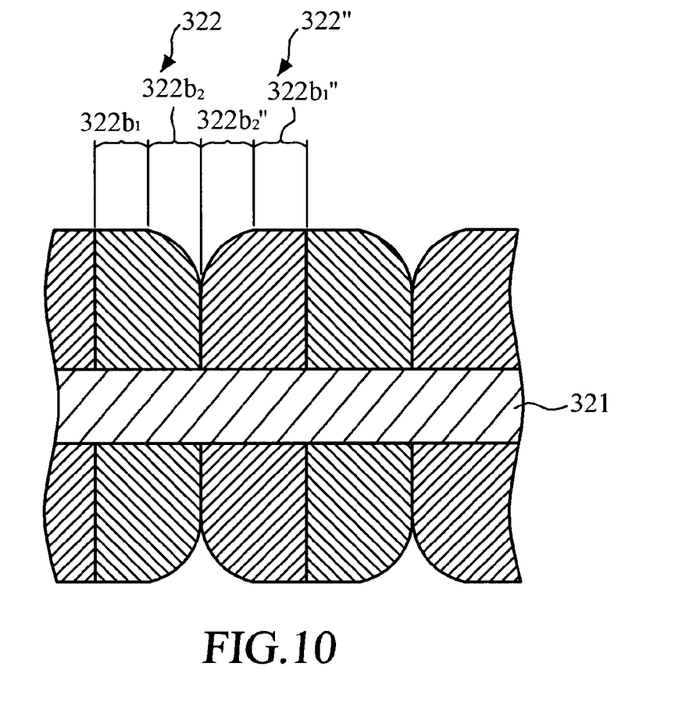
FIG. 10 illustrates that the sheared region of at least one of the connection plates neighbors to the sheared region of another one of the connection plate in a second embodiment of the present invention.

Additionally, in real applications, there are still many difference variations for the present invention. Following up, the variations of the present invention will be further disclosed as follows. Please refer to FIG. 10, which illustrates that the sheared region of at least one of the connection plates neighbors to the sheared region of another one of the connection plate in a second embodiment of the present invention. As shown in FIG. 10, in the second embodiment, one of the connection plates 322 neighbors to another connection plate 322" also formed with a sheared region 322b1" and a torn region 322b2". When the extension bar 321 perforates the connection plates 322 and the connection plate 322", the torn region 322b1 of the one of the connection plates 322 neighbors to the torn region 322b1" of the connection plate 322".

Figure 11:
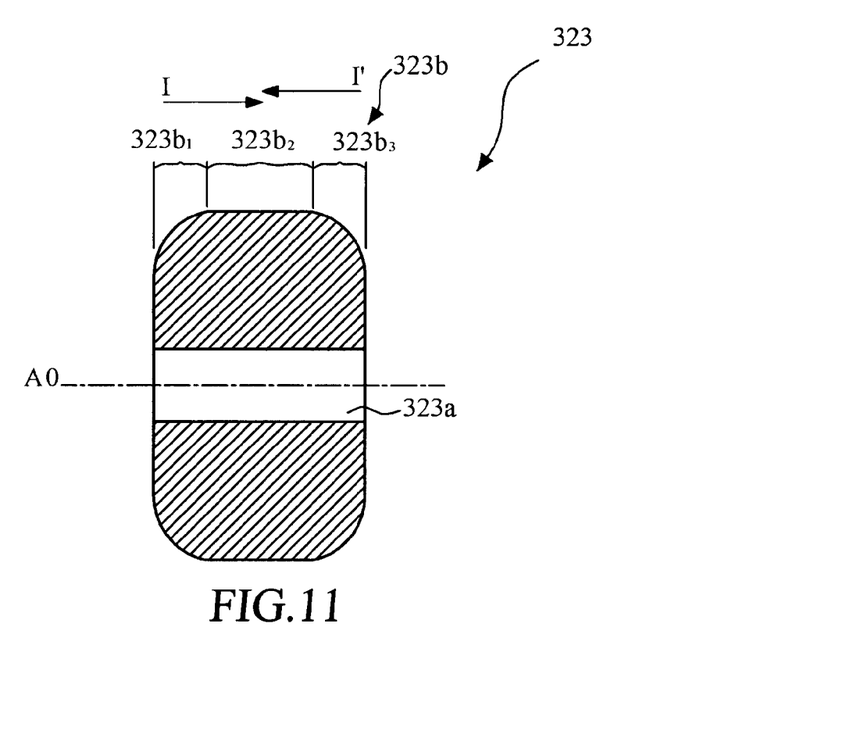
FIG. 11 illustrates that the connection plate is formed by punching along two punching direction in a third embodiment of the present invention.

Please go on refer to FIG. 11, which illustrates that the connection plate is formed by punching along two punching direction in a third embodiment of the present invention. As shown in FIG. 11, another connection plate 323 is applied to replace any one or more of the connection plates 322. The connection plate 323 is formed with a perforating hole 323a located with respect to the central axis AO, and further formed with a punched peripheral surface 323b. The connection plate 323 is formed by punching a plate in two punching directions I and I'. Therefore, a first torn region 323b1, a sheared region 323b2, and a second torn region 323b3 are formed on the punched peripheral surface 323b.

Figure 12:
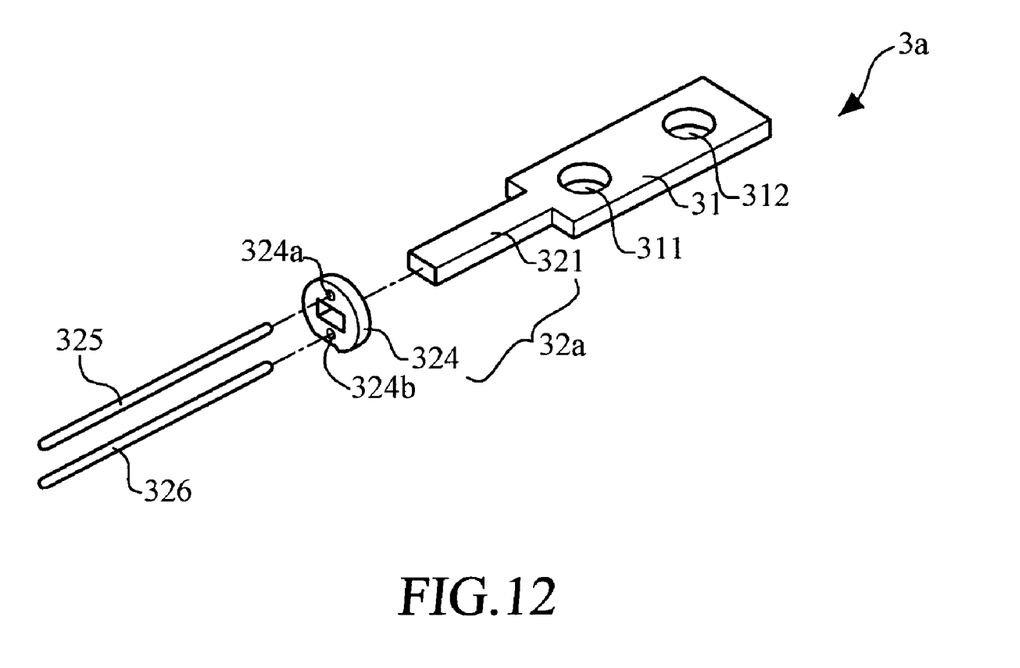
FIG. 12 illustrates that two assembling pins are applied to perforate the connection plates in a fourth embodiment of the present invention.

Please refer to FIG. 12, which illustrates that two assembling pins are applied to perforate the connection plates in a fourth embodiment of the present invention. As shown in FIG. 12, another combination-type male hinge 3a is applied to replace the combination-type male hinge 3, wherein another shaft portion 32a of the combination-type male hinge 3a is applied to replace the shaft portion 32 of the combination-type male hinge 3. The shaft portion 32a comprises the extension bar 321, a plurality of connection plates 324, two assembling pins 325 and 326. Differing from the connection plates 322, each of the connection plates 324 is additionally formed with two assembling holes 324a and 324b, and the assembling pins 325 and 326 respectively perforate the assembling holes 324a and 324b, so as to connect the connection plates 324.

People skilled in ordinary arts can easily realize that although the sheared region and the torn region are formed naturally in the punching processes; however, in practice, the dimension relations between the sheared region and the torn region can be precisely adjusted via combining proper modified punching blocks with the die.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A combination-type male hinge, comprising:
   a connection portion, and
   a shaft portion connected to the connection portion, and comprising:
      a extension bar extended from the connection portion;
      a plurality of connection plates being made by punching along at least one punching direction, and each of the connection plates comprising:
         at least one perforating hole for the extension bar perforating through; and
         a punched peripheral surface extended along the punching direction, and comprising said peripheral surface:
            a sheared region; and
            at least one torn region extended from the sheared region along the punching direction;
      wherein the shaft portion is formed by the extension bar perforating the connection plates and adapted to be connected to a female hinge.

2. The combination-type male hinge as claimed in claim 1, wherein the sheared region of at least one of the connection plates is neighboring to the torn region of the another one of the connection plates.

3. The combination-type male hinge as claimed in claim 1, wherein the sheared region of at least one of the connection plates is neighboring to the sheared region of another one of the connection plates.

4. The combination-type male hinge as claimed in claim 1, wherein the perforating hole has a central axis, which keeps in a first distance apart from the punched peripheral surface in the sheared region; keeps in the first distance apart from the punched peripheral surface in the torn region near the shear region; and further keeps in a second distance, less than the first distance, apart from the punched peripheral surface in the torn region away from the sheared region.

5. The combination-type male hinge as claimed in claim 1, wherein each of the connection plates further has a first surface formed with a positioning groove, and has a second surface formed with a positioning protrusion, so as to make the positioning protrusion of at least one of the connection plate be capable of inserting into the positioning groove of another one of the connection plates when the extension bar perforates the connection plates.

6. The combination-type male hinge as claimed in claim 1, wherein the extension bar is formed in a rectangular cross section, and the perforating hole is a rectangular hole matching to the rectangular cross section.

7. The combination-type male hinge as claimed in claim 1, wherein at least one of the connection plates is a substantially-circular plate structure.

8. The combination-type male hinge as claimed in claim 1, wherein the shaft portion is connected to the female hinge to form a hinge structure.

9. The combination-type male hinge as claimed in claim 8, wherein the sheared regions of the connection plates form a plurality of lubrication grooves with the female hinge.

10. The combination-type male hinge as claimed in claim 1, wherein the shaft portion further comprises at least one assembling pin, each of the connection plates is formed with at least one assembling hole, and the assembling pin perforates the assembling holes of the connection plates to perforate the connection plates.

* * * * *